United States Patent
Landais

(10) Patent No.: US 11,539,579 B2
(45) Date of Patent: Dec. 27, 2022

(54) METHOD AND APPARATUS FOR DETECTION OF NETWORK FUNCTION FAILURE AND RESTART IN A NETWORK ENVIRONMENT

(71) Applicant: Nokia Technologies Oy, Espoo (FI)

(72) Inventor: Bruno Landais, Pleumeur-Bodou (FR)

(73) Assignee: NOKIA TECHNOLOGIES OY, Espoo (FI)

(*) Notice: Subject to any disclaimer, the term of this patent is extended or adjusted under 35 U.S.C. 154(b) by 5 days.

(21) Appl. No.: 17/266,706

(22) PCT Filed: Aug. 9, 2018

(86) PCT No.: PCT/EP2018/071660
§ 371 (c)(1),
(2) Date: Feb. 8, 2021

(87) PCT Pub. No.: WO2020/030275
PCT Pub. Date: Feb. 13, 2020

(65) Prior Publication Data
US 2021/0306211 A1    Sep. 30, 2021

(51) Int. Cl.
*H04L 41/0686*    (2022.01)
*H04L 43/0817*    (2022.01)

(52) U.S. Cl.
CPC ...... *H04L 41/0686* (2013.01); *H04L 43/0817* (2013.01)

(58) Field of Classification Search
CPC . H04L 41/0686; H04L 43/0817; H04L 43/20; H04L 41/342
See application file for complete search history.

(56) References Cited

FOREIGN PATENT DOCUMENTS

EP    3128416 A1    2/2017

OTHER PUBLICATIONS

Pseudo-CR on Service Discovery and Registration using NRF service (Year: 2017).*
3rd Generation Partnership Project; Technical Specification Group Services and System Aspects; System Architecture for the 5G System; Stage 2 (Release 15) (Year: 2018).*
Examination Report for Indian Application No. 202147007382 dated Jan. 21, 2022, 8 pages.
"3rd Generation Partnership Project; Technical Specification Group Core Network and Terminals; 5G System; Network Function Repository Services; Stage 3 (Release 15)", 3GPP TS 29.510, V15.0.0, Jun. 2018, pp. 1-64.
"3rd Generation Partnership Project; Technical Specification Group Core Network and Terminals; 5G System; Session Management Services; Stage 3 (Release 15)", 3GPP TS 29.502, V15.0.0, Jun. 2018, pp. 1-116.
"Detecting NF (e.g. SMF) Failure and Restart via the NRF", 3GPP TSG CT WG4 Meeting #86, C4-186abc, Agenda : 7.2.1.3, Nokia, Aug. 20-24, 2018, 4 pages.

(Continued)

*Primary Examiner* — Anh Nguyen
(74) *Attorney, Agent, or Firm* — Alston & Bird LLP

(57) ABSTRACT

Computer program products, methods, and apparatuses, for providing and implementing the efficient detection of network component failures and restart conditions are described.

12 Claims, 8 Drawing Sheets

(56) References Cited

OTHER PUBLICATIONS

"3rd Generation Partnership Project; Technical Specification Group Core Network and Terminals; 5G System; Restoration Procedures (Release 15)", 3GPP TS 23.527, V0.1.0, Jul. 2018, pp. 1-9.
International Search Report and Written Opinion received for corresponding Patent Cooperation Treaty Application No. PCT/EP2018/071660, dated Apr. 1, 2019, 11 pages.
"Pseudo-CR on Service Discovery and Registration using NRF service", 3GPP TSG CT4 Meeting #79, C4-174332, Agenda : 6.2.1, Ericsson, Aug. 21-25, 2017, 4 pages.
"3rd Generation Partnership Project; Technical Specification Group Services and System Aspects; System Architecture for the 5G System; Stage 2 (Release 15)", 3GPP TS 23.501, V15.2.0, Jun. 2018, pp. 1-217.

* cited by examiner

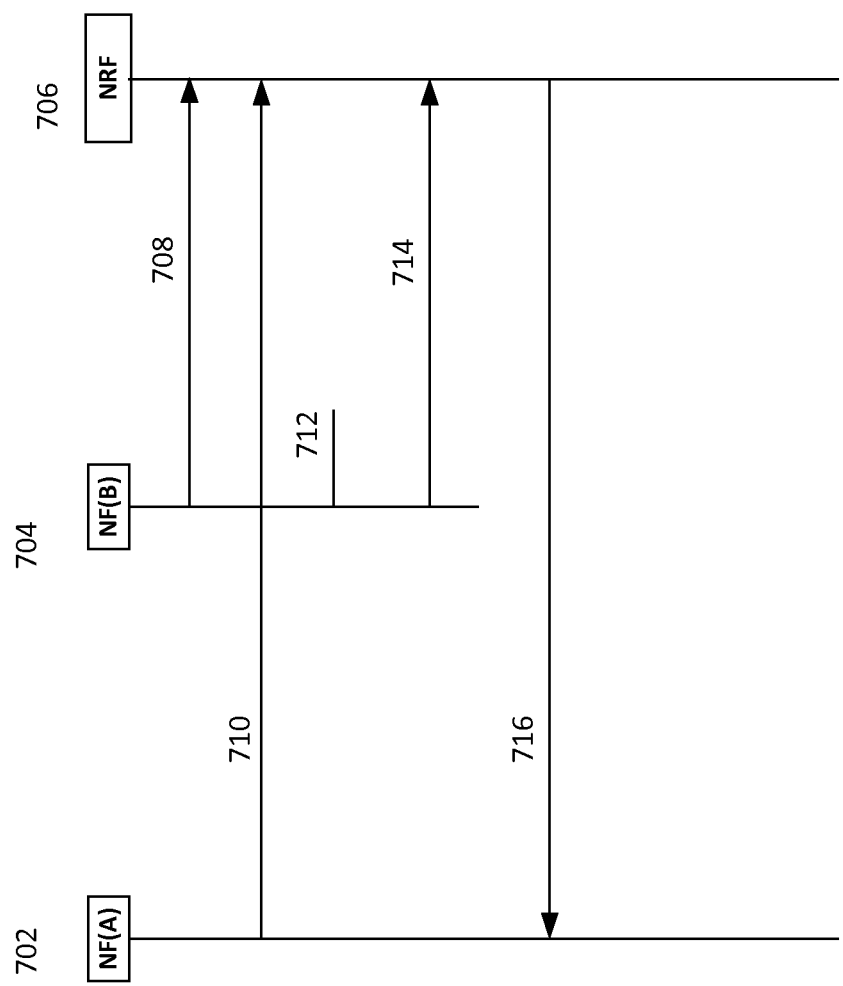

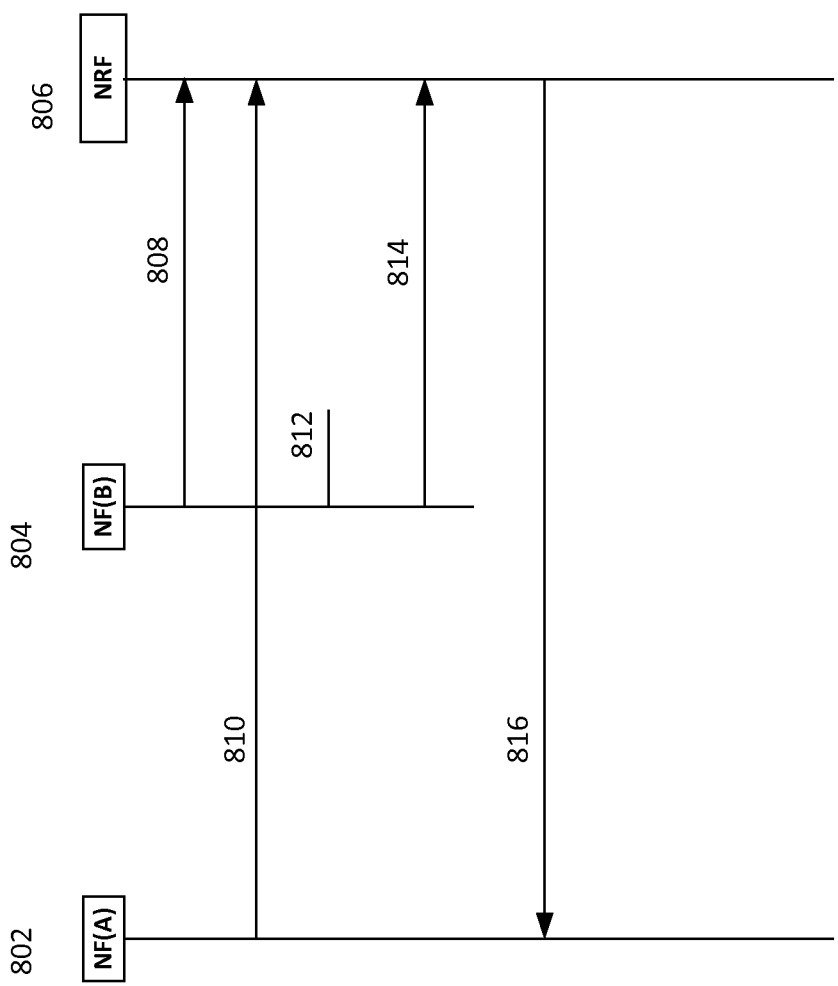

METHOD AND APPARATUS FOR DETECTION OF NETWORK FUNCTION FAILURE AND RESTART IN A NETWORK ENVIRONMENT

RELATED APPLICATION

This application claims priority to PCT Application No. PCT/EP2018/071660, filed on Aug. 9, 2018, which is incorporated herein by reference in its entirety.

BACKGROUND

Users of modern telecommunications networks have adopted the use of such networks to access, move, and process significant volumes of data. As a result, telecommunications networks have become an essential and irreplaceable tool supporting many aspects of the way people conduct business, access important information, and go about their daily lives. While many modern telecommunications networks have proven capable of providing reliable service to many users, the centrality of network connectivity to processes that touch on essential aspects of users' health, safety, business, and lifestyle has created the need for improvements in the reliability and resiliency of current and next-generation telecommunications networks.

BRIEF SUMMARY

Current telecommunications systems that follow architectures and protocols associated with and/or similar to those set out in 3GPP Release 15 do not support the concept of a set of Session Management Functions (SMFs). Instead, the Access and Mobility Management Function (AMF) selects a single SMF instance (or, for example, V-SMF and H-SMF instances in the context of a Home Routed (HR) packet data unit (PDU) session) during the establishment of the PDU session. This single instance is then used for subsequent procedures within the network, such as a PDU session modification or release, for example. The SMF or services associated with the SMF may be impacted by failures or restarts, such that the SMF becomes prevented from continuing to provide the services associated with the SMF. Since only a single instance of the SMF is selected in connection with a given PDU session, the failure or restart of the SMF can have a number of detrimental effects on the service provided to end users, the operation of other network functions, components, and/or services, and the overall efficiency, reliability, and/or resiliency of the network. Thus, a solution is needed to address the ability of other network functions to detect a failure or restart in an SMF or other network function service producer (such as an SMF or NF Instance or an SMF or NF Service Instance failure and/or restart, for example). It will be appreciated that while many of the examples described herein use language associated with the failure or restart of a NF service producer, example implementations in accordance with embodiments of the invention disclosed and/or otherwise described herein may be used in connection with detecting the failure and/or restart of any NF.

Methods, apparatuses, and computer program products are provided in accordance with certain example embodiments in order to provide for the use of Network Resource Functions (NRFs) to enable a Network Function (NF) to detect and respond to failures and/or restarts of an SMF and/or other relevant Network Functions.

In one example embodiment, a method for identifying a change of status of a network function service provider within a network environment is provided, the method including: detecting or receiving at a network resource function (NRF), an indication of a change in a status of a network function service provider; changing, in the NRF, an attribute associated with the network function service provider; and notifying a subscribed network function of the change in status of the network function service provider. In some example implementations of such a method, the network function service provider is a session management function (SMF), the subscribed network function is an Access and Mobility Function (AMF) or Policy Control Function (PCF) and the attribute associated with the network function service provider is an NFStatus or NFServiceStatus attribute of a network function profile or network function service profile set to SUSPENDED. In some such example implementations, and in other example implementations, the change of the status of the network function service provider is a failure of an NF instance or an NF Service instance. In some such example implementations, and in other example implementations, the change of the status of the network function service provider is a restart of an NF instance or an NF Service instance.

In some such example implementations, and in other example implementations, the method further includes identifying a time at which the change in the status of the network function service provider occurred; and associating the time with an instance of the network function service provider. In some such example implementations, and in other example implementations, the method further includes receiving a notification of the change in status of a network function service provider, optionally including the time at which the change in the status of the network function service provider occurred; determining a set of network resources associated with the network function service provider prior to the time, if the time at which the change in the status of the network function service provider occurred was received in the notification; and identifying, within the set of network resources, one or more resources lost to the network function service provider. In some such example implementations, and in other example implementations, identifying, within the set of network resources, one or more resources lost to the network function service provider comprises determining, by the subscribed network function, whether a resource was associated with the network function service provider prior to the time.

In another example embodiment, an apparatus for identifying a change of status of a network function service provider within a network environment is provided, the apparatus including at least one processor and at least one memory including computer program code, the at least one memory and the computer program code configured to, with the processor, cause the apparatus to at least: detect or receive an indication of a change in a status of a network function service provider; change an attribute associated with the network function service provider; and notify a subscribed network function of the change in status of the network function service provider. In some example implementations of such an apparatus, the network function service provider is a session management function (SMF); the subscribed network function is an Access and Mobility Function (AMF) or Policy Control Function (PCF); and the attribute associated with the network function service provider is an NFStatus or NFServiceStatus attribute of a network function profile or network function service profile set to SUSPENDED. In some such example implementations, and in other example implementations, the change of the status of the network function service provider is a failure of an NF instance or an NF Service instance. In some such example implementations, and in other example implementations, the change of the status of the network function service provider is a restart of an NF instance or an NF Service instance.

In some such example implementations, and in other example implementations, the at least one memory and the computer program code are further configured to, with the processor, cause the apparatus to at least identify a time at which the change in the status of the network function service provider occurred; and associate the time with an instance of the network function service provider. In some such example implementations, and in other example implementations, the at least one memory and the computer program code are further configured to, with the processor, cause the apparatus to at least: receive a notification of the change in status of a network function service provider, optionally including the time at which the change in the status of the network function service provider occurred; determine a set of network resources associated with the network function service provider prior to the time; and identify, within the set of network resources, one or more resources lost to the network function service provider. In some such example implementations, and in other example implementations, identifying, within the set of network resources, one or more resources lost to the network function service provider comprises determining whether a resource was associated with the network function service provider prior to the time.

In another example embodiment, a non-transitory computer-readable storage medium for identifying a change of status of a network function service provider within a network environment is provided, the non-transitory computer-readable storage medium storing program code instructions that, when executed, cause an apparatus to: detect or receive an indication of a change in a status of a network function service provider; change an attribute associated with the network function service provider; and notify a subscribed network function of the change in status of the network function service provider. In some such example implementations, and in other example implementations, the network function service provider is a session management function (SMF); the subscribed network function is an Access and Mobility Function (AMF) or Policy Control Function (PCF); and the attribute associated with the network function service provider is an NFStatus or NFServiceStatus attribute of a network function profile or network function service profile set to SUSPENDED. In some such example implementations, and in other example implementations, the change of the status of the network function service provider is a failure of an NF instance or an NF Service instance. In some such example implementations, and in other example implementations, the change of the status of the network function service provider is a restart of an NF instance or an NF Service instance.

In some such example implementations, and in other example implementations, the program code instructions when executed, further cause an apparatus to: identify a time at which the change in the status of the network function service provider occurred; and associate the time with an instance of the network function service provider. In some such example implementations, and in other example implementations, the program code instructions, when executed, further cause an apparatus to: receive a notification of the change in status of a network function service provider, optionally including the time at which the change in the status of the network function service provider occurred; determine a set of network resources associated with the network function service provider prior to the time; and identify, within the set of network resources, one or more resources lost to the network function service provider. In some such example implementations, and in other example implementations, identifying, within the set of network resources, one or more resources lost to the network function service provider comprises determining, whether a resource was associated with the network function service provider prior to the time.

In another example embodiment, an apparatus for identifying a change of status of a network function service provider within a network environment is provided, the apparatus including means for detecting or receiving at a network resource function (NRF), an indication of a change in a status of a network function service provider; means for changing, in the NRF, an attribute associated with the network function service provider; and means for notifying a subscribed network function of the change in status of the network function service provider. In some example implementations of such a method, the network function service provider is a session management function (SMF), the subscribed network function is an Access and Mobility Function (AMF) or Policy Control Function (PCF) and the attribute associated with the network function service provider is an NFStatus or NFServiceStatus attribute of a network function profile or network function service profile set to SUSPENDED. In some such example implementations, and in other example implementations, the change of the status of the network function service provider is a failure of an NF instance or an NF Service instance. In some such example implementations, and in other example implementations, the change of the status of the network function service provider is a restart of an NF instance or an NF Service instance.

In some such example implementations, and in other example implementations, the apparatus further includes means for identifying a time at which the change in the status of the network function service provider occurred; and means for associating the time with an instance of the network function service provider. In some such example implementations, and in other example implementations, the apparatus further includes means for receiving a notification of the change in status of a network function service provider, optionally including the time at which the change in the status of the network function service provider occurred; means for determining a set of network resources associated with the network function service provider prior to the time, if the time at which the change in the status of the network function service provider occurred was received in the notification; and means for identifying, within the set of network resources, one or more resources lost to the network function service provider. In some such example implementations, and in other example implementations, identifying, within the set of network resources, one or more resources lost to the network function service provider comprises determining, by the subscribed network function, whether a resource was associated with the network function service provider prior to the time.

BRIEF DESCRIPTION OF THE DRAWINGS

Figure 1:
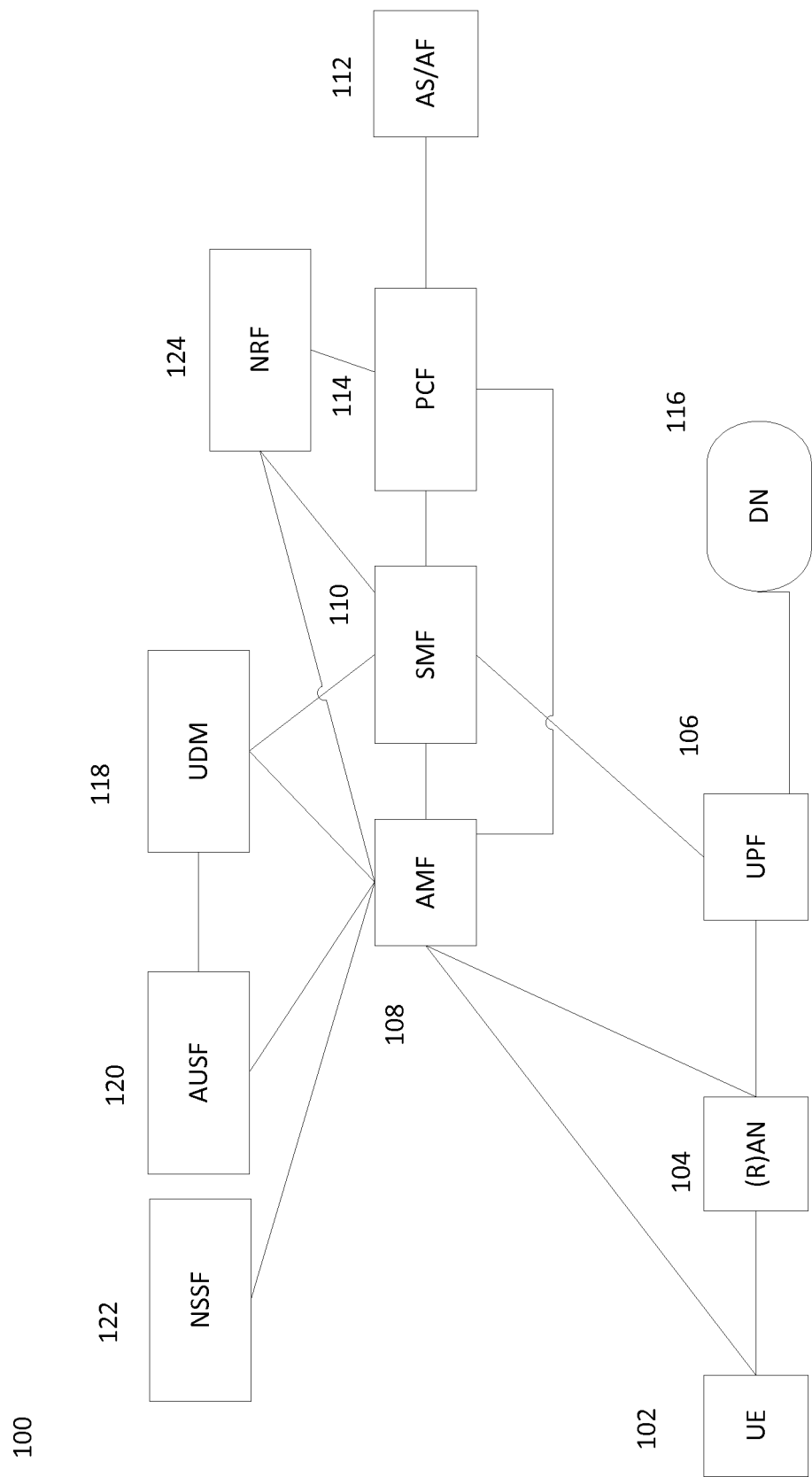
Figure 2:
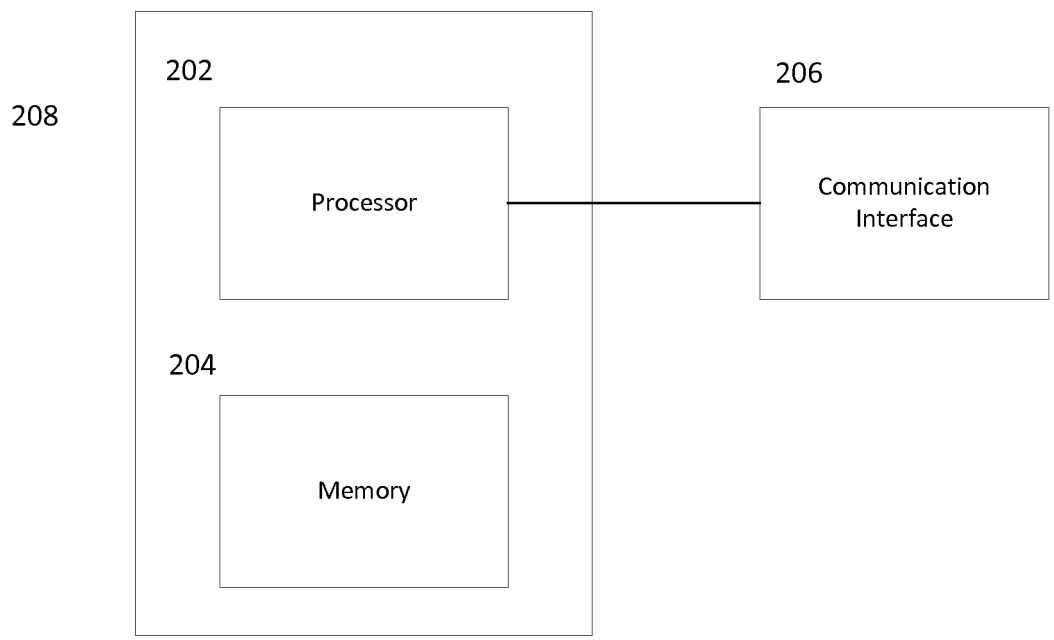
Figure 3:
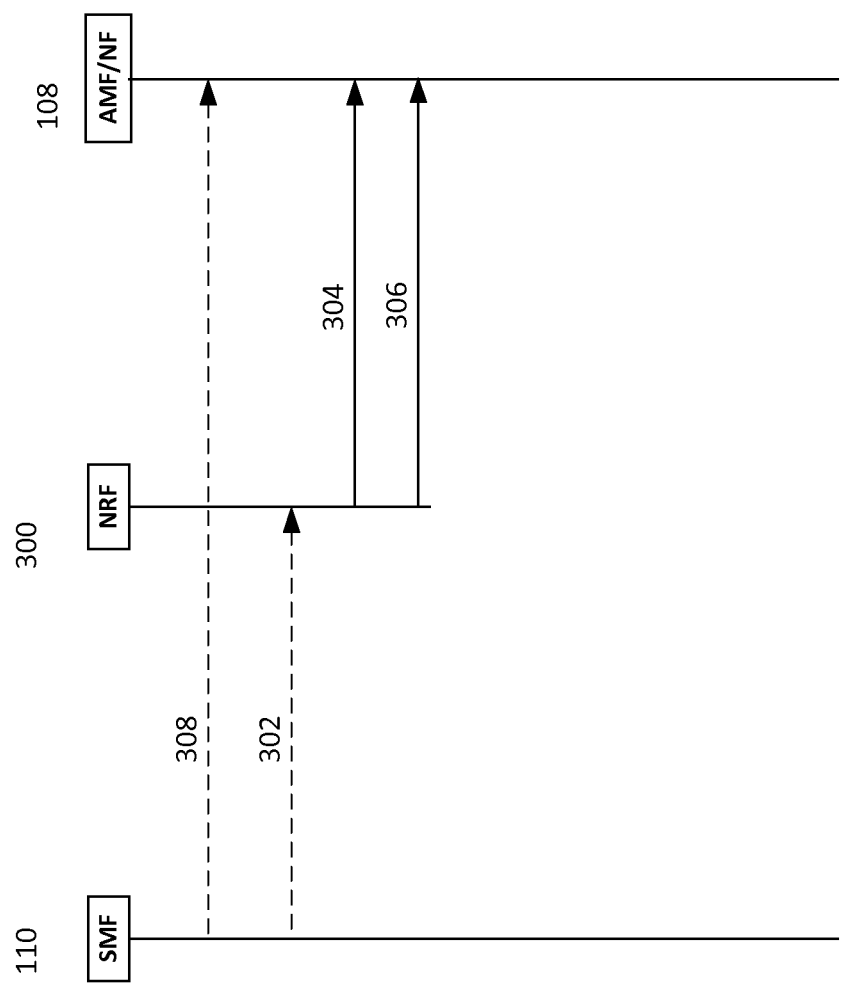
Figure 4:
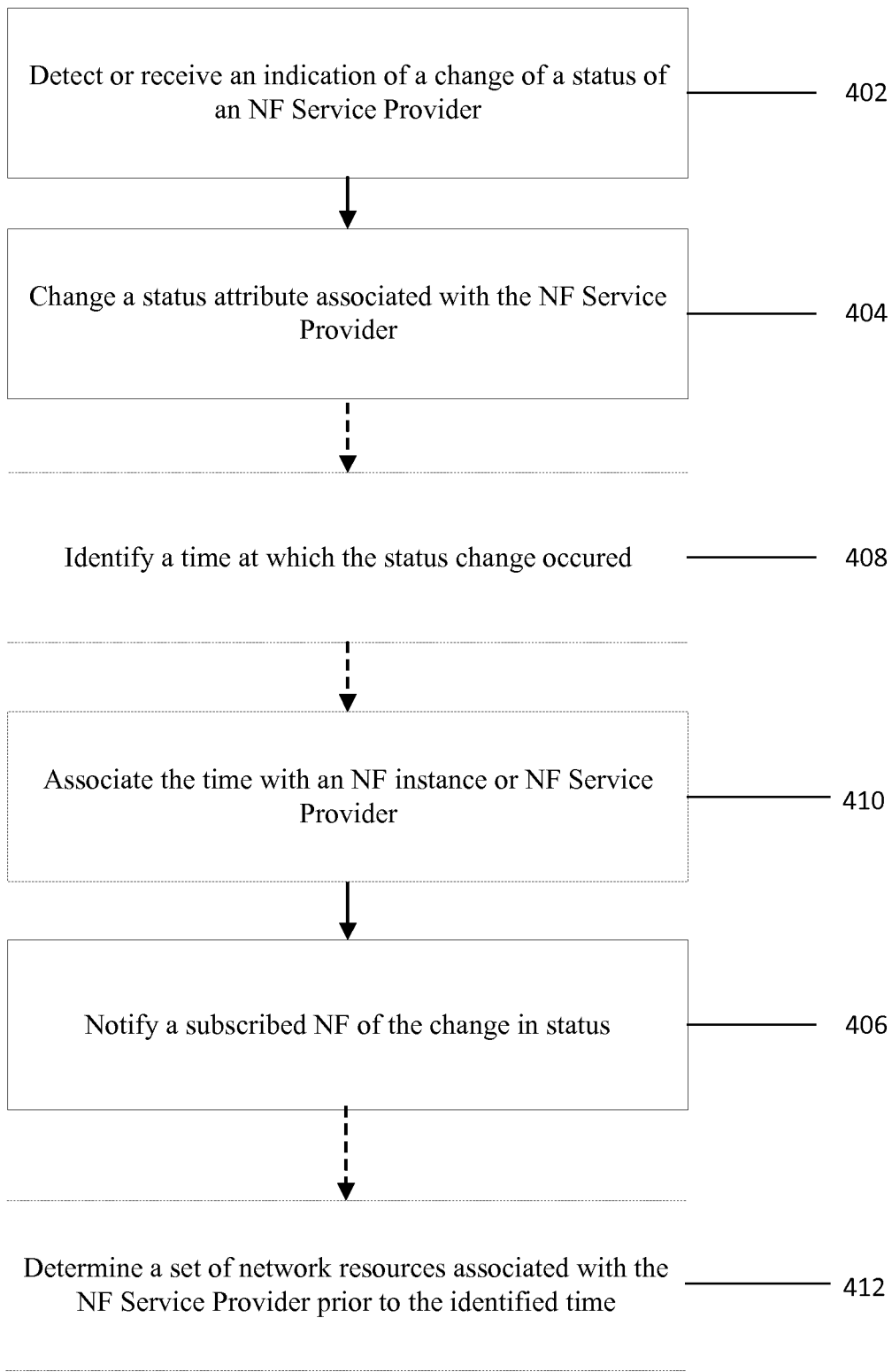
Figure 5:
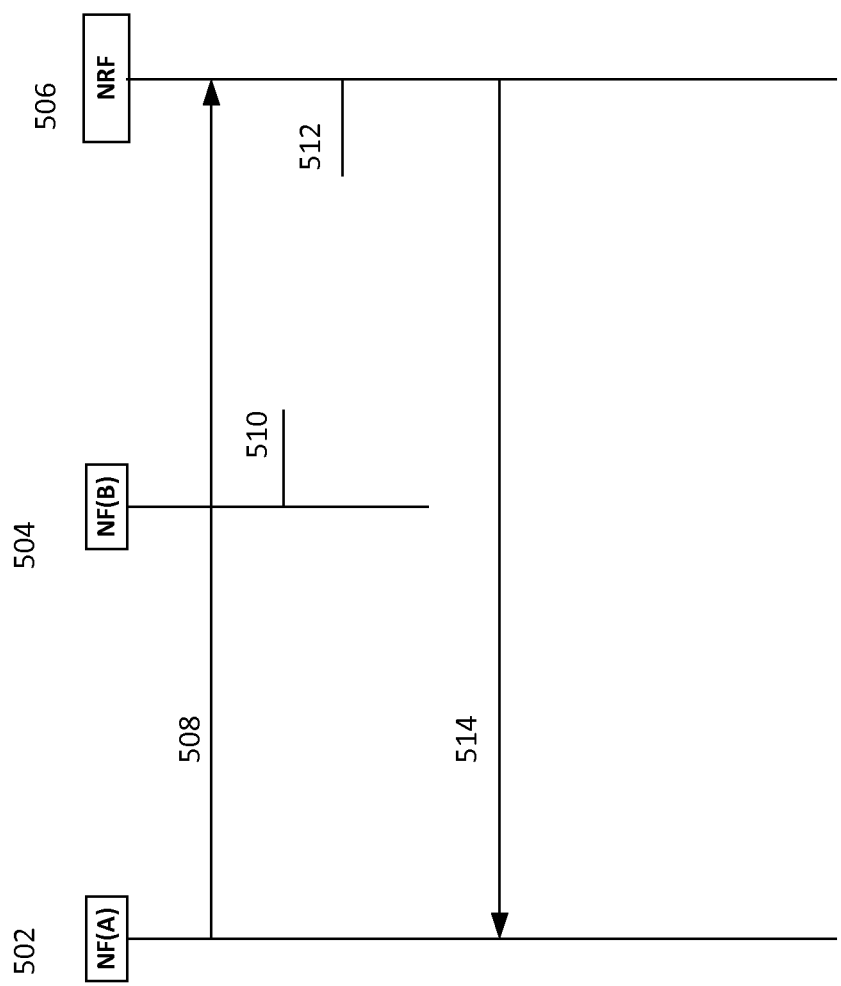
Figure 6:
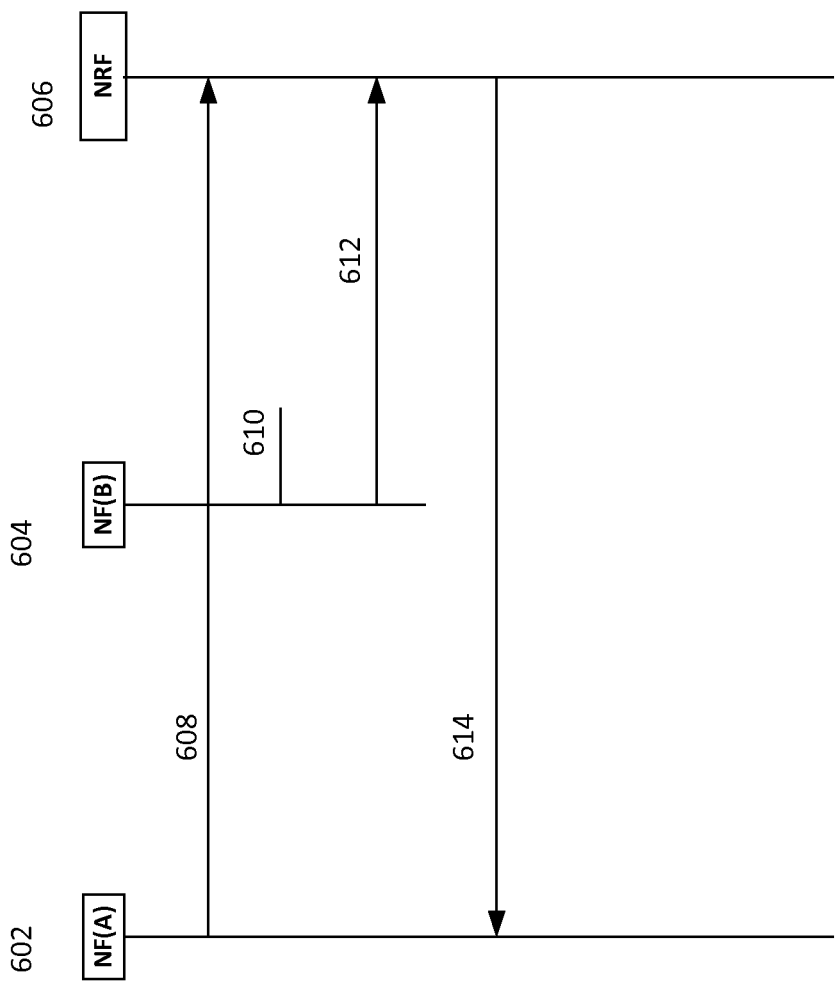

Having thus described certain example embodiments of the invention in general terms, reference will now be made to the accompanying drawings, which are not necessarily drawn to scale, and wherein:

FIG. 1 is a networked system in accordance with an example embodiment of the present disclosure;

FIG. 2 is a block diagram of a network apparatus configured in accordance with an example embodiment of the present disclosure;

FIG. 3 is an end-point flow chart according to an example embodiments of the present disclosure;

FIG. 4 is a flowchart illustrating detecting a failure or restart in an NF in accordance with an example embodiment of the present disclosure;

FIG. 5 is another end-point flow chart according to an example embodiments of the present disclosure;

FIG. 6 is another end-point flow chart according to an example embodiments of the present disclosure;

FIG. 7 is another end-point flow chart according to an example embodiments of the present disclosure; and FIG. 8 is another end-point flow chart according to an example embodiments of the present disclosure;

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Methods, systems, apparatuses, and computer program products are provided in accordance with example embodiments to provide for the enabling of a network function (NF) within a telecommunications network to discover the failure or restart of an NF service producer (such as an NF Instance or NF Service Instance failure and/or restart, for example) through the use of Network Resource Function (NRF) services as described herein.

One of the goals associated with efforts surrounding the Fifth Generation Core Network (5GC) and/or other network development efforts in the achievement of a degree of reliability and resiliency that at least matches that associated with the Evolved Packet Core (EPC). Some approaches to doing so involve the use of a heartbeat procedure (such as a heartbeat procedure implemented as a new Session Management Function (SMF) service operation to enable Network Function (NF) service consumers of the SMF PDUSesssion service to detect and handle a failure or restart of the relevant SMF. However, this approach is not particularly oriented towards services and/or a service based architecture (SBA).

In example implementations of the embodiments described and/or otherwise disclosed herein, NRF services are leveraged to enable Network Functions (NFs), such as Access and Mobility Functions (AMFs) and/or V- or H-SMFs, for example, to be notified about the failure and/or restart of the relevant SMF (and/or V/H-SMF, and/or other NF). As noted above, many current network implementations (such as those that reflect and/or incorporate aspects of 3GPP release 15, for example) do not support the concept of an SMF set. Instead, the SMF selects a single SMF instance (or, V-SMF and H-SMF instances for an HR PDU session, for example) during the establishment of the relevant PDU session. This single, selected SMF instance in then used for further, subsequent procedures within the network (such as a PDU session modification and/or release, for example). One of the technical challenges that can arise in such network implementations is associated with the impact that the failure and/or restart of an SMF and/or SMF services can have on other network functions, services, and/or components. For example, the failure and/or restart of the SMF instance (and/or a the PDUSession service instance, for example) may result in the loss of session management (SM) and/or PDU, the loss of a Packet Forwarding Control Protocol (PFCP) session in a User Plane Function UPF), the hanging of resources in peer Network Functions (NFs) (such as in the V-SMF and/or H-SMF when a failure impacts the H-SMF or V-SMF, respectively, for example), service disruption for end users (such as the loss of IP Multimedia Core Network Subsystem (IMS) services, for example), the inability to restore corresponding services (such as if peer NFs cannot detect the SMF failure and/or restart, for example), and other negative impacts on the operation of the network.

Example implementations of the solutions described and/or otherwise disclosed herein particularly contemplate several scenarios:

1. SMF (PDUSession Service) Instance Failure or Restart (Non-Roaming or Local Breakout (LBO))

In such an example scenario, one or more AMFs may detect an SMF (or PDUSession service) instance failure by receiving no responses to signaling sent from the SMF (or PDUSession service) instance. AMFs (and/or other NFs, for example) may also subscribe to the NRF to be notified regarding NF instance status changes (such as NF profile changes and/or NF deregistration events, for example). Consequently the NRF can detect an NF instance failure using the NRF heartbeat mechanism, then responsively change a status indicator (such as by changing the NFStatus value of the NF instance to SUSPENDED, for example), and notify one or more subscribed NFs that the given NF instances is suspended and/or deregistered. In some example situations where only an NF service instance fails (and not the NF instance itself), the NFUpdate service function operation and/or a similar operation allows for changing a new status indicator associated to the service (such as by changing a new NFServiceStatus value of the NF Service to SUSPENDED, for example) or the removal of the corresponding service instance from the relevant NF profile. In such situations, a new NFServiceStatus attribute at the NFService level could be defined to allow for signaling to a relevant NRF that a NF service instance is suspended. Regardless of how the relevant status indicator is implemented and/or changed, the NRF can then notify the subscribed NFs that the NF service instance is no longer part of the relevant NF profile and/or has been suspended.

It will be appreciated that current network implementations do not feature means to allow AMFs (and other NFs) to detect an SMF restart. The lack of this functionality renders a network susceptible to inefficiencies and failures associated with SMF restarts. In particular, an SMF restart and/or an SMF service instance restart can result in the loss of Session Management (SM) contexts. Moreover, an SMF restart may result in a new NFRegister request being sent to the NRF, though a restart of an SMF service instance may not result in any SMF signaling to a relevant NRF.

To address the technical challenges described herein, and other technical challenges associated with the failure and/or restart of an SMF instance and/or SMF service instance, some example implementations of embodiments of the invention described and/or otherwise disclosed herein enable AMFs (and, more generally, other NFs) to be notified by an NRF about a restart of an SMF instance and/or a restart of an SMF service instance (and, for example, about a restart of other NF service producers). In such example implementations, a new attribute (which may be labeled "smfRecoveryTime", for example) may be defined in the heartbeat functionality of the SMF and/or other relevant NF, and the SMF PDUSession signaling is used to allow for the detection of an SMF (such as a PDUSession service) instance restart. It will be appreciated that, depending on the network configuration, this approach may be specific to the PDUSession service and/or a similar service.

In other example implementations of embodiments of the invention described and/or otherwise disclosed herein enable AMFs (and, more generally, other NFs) to be notified by an NRF about a restart of an SMF instance and/or a restart of an SMF service instance (and, for example, about a restart of other NF service producers) by causing an NF service producer, such as an SMF to register a new recovery time attribute (which may be labeled "recoveryTime", for example, in the relevant NF (or NF service) instance profile in the relevant NF, set to the time at which the NF (or NF service) started and/or restarted. The NRF may then notify any subscribed NFs of any change in the recoveryTime attribute using a service operation, such as the existing NFStatusNotify operation, and/or any other operation that is suitable for conveying a change in an attribute to a subscribed NF. In some such example implementations, to allow the AMFs to identify the resources that may be impacted by an SMF restart, the SMF can return a new timestamp attribute during the establishments of the PDU session (such as in connection with the creation of the individual SM context and/or PDU session resource, for example). Resources older than the recoveryTime attribute notified by the NRF for the SMF (or PDUSession service, depending on the situation, for example) instance can be considered as lost in the SMF. In some example implementations, when detecting the SMF (or PDUSession service) instance failure and/or restart, the AMF may trigger additional actions to attempt to recover the service. For example, the user equipment (UE) may be triggered to release the PDU session impacted by the failure, such as through the use of a re-activation flag and/or other approach. It will be appreciated that in many network environments, an AMF is unable to attempt to restore a given PDU session towards a new or restarted SMF without involving the UE, as a new IP address may have been assigned to the UE in a relevant time interval.

As such, in some example implementations, one or more AMFs or other NFs may detect an SMF (or PDUSession service) instance failure by receiving no responses to signaling sent to the SMF (or PDUSession service) instance. AMFs (and other NFs) may also subscribe to the NRF to be notified regarding NF instance status changes (such as NF Profile changes and/or NF deregistration events.

Some example implementations arise in the context of an NF failure. In such example implementations, the NRF may detect an NF instance failure using the NRF heartbeat mechanism, and responsively change the NFStatus of the NF instance to SUSPENDED. Upon changing the NF status of the relevant NF instance, the NRF notifies any subscribed NFs (which have subscribe do to receiving notifications of changes of the NF profile) that the particular NF instance is suspended. An example implementation arising in such a scenario is shown and described herein in connection with FIG. 5. In particular, FIG. 5 can be used to depict an example implementation where NF(A) 502 subscribes to the NRF 506 to receive notifications of changes of NF(B) 504 Profile, as specified in 3GPP TS 29.510. After an NF failure occurs at NF(B) 504, the NRF 506 detects that NF(B) is no longer operative using the NF Heart-Beat procedure specified in subclause 5.2.2.3.2 of 3GPP TS 29.510. The NRF 506 then changes the NFStatus of NF(B) to SUSPENDED, and the NRF 506 notifies NFs having subscribed to receive notifications of changes of NF(B) 504 Profile that the NFStatus of NF(B) 504 is SUSPENDED. NF(A) 502 may then trigger appropriate restoration or clean-up actions.

It will be appreciated that the de-registration of an NF Profile does not entail that the NF is no longer operative. For example, a NF can deregister from the NRF ahead of a scale-in operation to stop other NFs to discover the NF for subsequent sessions. Instead, the SUSPENDED NFStatus is by definition an explicit indication that the NF is no longer operative.

Some example implementations arise in the context of an NF Service Failure. FIG. 6, as discussed in more detail herein, may be used to depict some such example implementations. In some such example implementations, A new NFServiceStatus attribute is defined at the NFService level, to allow registering in the NF Profile that a NF Service instance is REGISTERED or SUSPENDED (and/or otherwise not operative, for example). If only an NF service instance fails (but not the NF Instance itself), the NFUpdate service operation allows to update the NF service status to SUSPENDED. The NRF can then notify to NFs subscribed to receiving notification of changes of the NF profile that the NF service Instance is suspended.

With reference to FIG. 6, in some such example implementations, NF(A) 602 subscribes to the NRF 606 to receive notifications of changes of NF(B) 604 Profile. When an NF Service failure occurs at NF(B) 604, the NF(B) 604 (other than the failed NF Service) may still be operative. In such a situations, NF(B) 604 (or an OAM, for example)) updates its NF Profile in the NRF 606 by setting the NFServiceStatus of the failed NF Service to SUSPENDED. The NRF 606 then notifies NFs having subscribed to receive notifications of changes of NF(B) 604 Profile that the NF Service status of the failed NF service of NF(B) 604 is SUSPENDED. NF(A) 602 may then trigger appropriate restoration or clean-up actions.

It will be appreciated that no means exist currently in conventional telecommunications networks to allow AMFs (and other NFs) to detect an SMF restart. An SMF restart or an SMF service instance restart may result in losing the Session Management (SM) contexts. An SMF Restart may result in a new NFRegister request being sent to the NRF (though, in some situations, this might not be necessarily the case, such as if an OAM system registers the NF in NRF). The restart of an SMF service instance may not result in any SMF signaling to the NRF.

Consequently, some example implementations provide mechanisms and/or approaches through which AMFs (and more generally other NFs) can be notified about an SMF instance restart or SMF service instance restart (and more generally about a restart of other NF Service Producers). For example, and with reference to FIG. 7 (which is described in more detail herein), some example implementations arise in the context of an NF restart. A NF Service Producer (such as an SMF, for example) may register a new recoveryTime attribute in its NF (or NF service) instance profile in the NRF, if restarts of the NF (or NF Service) results in losing contexts, set to the time at which the NF (or NF Service) (re)started. The NRF then notifies the change of the recoveryTime to subscribed NFs using the existing NFStatusNotify service operation. In some such example implementations, NF(B) 704 (or an OAM) registers NF(B) 704 Profile to the NRF 706. The NF(B) 704 Profile may include the recoveryTime attribute, if a restart of NF(B) 704 results in losing contexts. In such a situation, the NF(A) 702 subscribes to the NRF 706 to receive notifications of changes of NF(B) 704 Profile. As such, when NF(B) 704 restarts, if contexts are lost during the restart, NF(B) 704 (or OAM) updates the recoveryTime in its NF Profile in the NRF 706. The NRF 706 then responsively notifies NFs (such as NF(A) 702) having subscribed to receive notifications of changes of NF(B) 704 Profile about the updated recoveryTime of NF B Profile. NF(A) 702 may consider that all the resources created in the NF(B) 704 before the NF(B) 704 recovery time have been lost. NF(A) 702 may then trigger any appropriate restoration or clean-up actions.

Some example implementations address an NF service restart in a similar manner With reference to FIG. 8 (which is described in more detail herein), in some such example implementations, NF(B) 804 (or an OAM) registers its NF(B) 804 Profile (and its services) to the NRF 806. The NF(B) 804 Profile may include the recoveryTime attribute for the NF Services it supports, if a restart of a NF(B) 804 service results in losing contexts. In such example implementations, NF(A) 802 subscribes to the NRF 806 to receive notifications of changes of the NF(B) 804 Profile. When an NF(B) 804 service restarts, if contexts are lost during the service restart, NF(B) 804 (or OAM) updates the recoveryTime of the corresponding NF Service in the NRF 806. The NRF 806 then responsively notifies NFs (such as NF(A) 802, for example) having subscribed to receive notifications of changes of NF(B) 804 Profile about the updated recoveryTime of the NF(B) 804 Service. With such information, NF(A) 802 may consider that all the resources created in the NF(B) 804 service before the NF(B) 804 service recovery time have been lost. NF(A) 802 may then trigger appropriate restoration or clean-up actions.

It will be appreciated that, to allow the AMFs to identify the resources affected by the SMF restart, the SMF can return a new Timestamp attribute during the establishment of the PDU session (for example, creation of the individual SM context or PDU session resource). Resources older than the recoveryTime notified by the NRF for the SMF (or PDUsession service) instance can be considered as lost in the SMF. When detecting the SMF (PDUSession service) instance failure or restart, the AMF may trigger appropriate actions to recover the service, such as trigger the UE to release the PDU session affected by the failure, for example, and/or optionally asking the UE to re-establish the PDU session, as another example. It will also be appreciated that, in many situations, the AMF cannot try to restore the PDU session towards a new or restarted SMF without involving the UE, as a new UE IP address could be assigned.

2. V-SMF (PDUSession Service) Instance Failure or Restart (HR Roaming)

Some example implementations of embodiments of the invention disclosed and/or otherwise described herein arise in contexts involving a V-SMF and/or PDUSession service instance failure and/or restart in association with HR roaming. In such situations, principles and approaches described herein with respect to non-roaming and/or local breakout situations. For example, an AMF may detect and/or be notified of a V-SMF failure and/or restart and trigger the appropriate action to recover the service, as described above. In some example implementations involving PDU sessions that are re-established by the UE, the AMF can select the same H-SMF, which allows for the cleaning up and any hanging resource in the H-SMF. In other example implementations, the H-SMF may detect the failure and/or restart of the V-SMF instance (or, for example, the V-SMF PDUSession service instance, for example), as described above with respect to scenario 1. In such example implementations, the relevant network functions and/or network service subscribe to NF status changes from NF instances for another public land mobile network (PLMN), based on a network operator's policy. In some such example implementations, in order to allow the H-SMF to identify the resources impacted by the V-SMF restart (and/or failure, for example) the V-SMF may signal a new timestamp attribute to the H-SMF during the creation of the PDU session. The V-SMF may also, for example, signal the V-SMF service instance serving the PDU session in a new attribute. Consequently, the H-SMF can release PDU session resources impacted by a failure and/or restart of a V-SMF instance and/or a V-SMF service. Such impacted resources may include, but are not limited to resources associated with a UPF, PCF, and/or CHF.

3. H-SMF (PDUSession Service) Instance Failure or Restart (HR Roaming)

Some example implementations of embodiments of the invention disclosed and/or otherwise described herein arise in contexts involving an H-SMF and/or PDUSession service instance failure and/or restart in association with HR roaming. In such situations, principles and approaches described herein with respect to situations involving a V-SMF are largely applicable. For example, in some example implementations of embodiments that arise in such a scenario, one or more AMFs detect and/or are notified that an H-SMF failure or restart has occurred, and the AMFs responsively trigger appropriate action to recover the relevant service and/or services, as described herein with respect to the non-roaming and/or local breakout situations, for example. With respect to PDU session that are re-established by the UE, a relevant AMF can select the same V-SMF or not. In situations where the same V-SMF is not chosen, the AMF releases the SM context in the previous V-SMF. In some example implementations, to allow the AMF to identify the resources impacted by the H-SMF restart, the H-SMF signals a new timestamp attribute to the V-SMF and the AMF during the PDU session establishment.

It will be appreciated that in some example implementations, it may be advantageous to redirect requests to an alternative SMF server. In some network environments, the SMF API explicitly specifies the support of redirection (e.g. 307) for operations that allow for the creation of an SM context and/or a service. In some network environments, these operations are denoted as the Create SM Context and Create Service operations. It will be appreciated that in a distributed SMF implementation, it may be useful for an SMF instance to move SM contexts to a different processing instance and to expect further requests for such SM contexts to be sent subsequently the that processing instance (of the same SMF instance). In some environments, this approach to switching SM contexts may alleviate an overload condition on a given processing instance and/or support scale-in operations within the SMF instance without losing on-going PDU sessions. Consequently, some example implementations of embodiments of the invention disclosed and/or otherwise described herein contemplate network environments where explicit support of the redirection of all SMF service operations is provided.

As described with respect to the scenarios outlined above, example implementations of embodiments of the invention disclosed herein address and overcome many of the technical challenges associated with the failure and/or restart of an NF service producer (such as a failure and/or restart of an NF instance and/or NF service instance, for example), by using NRF services to enable a relevant NF to discover the failure and/or restart condition. In some such example implementations, this may be accomplished upon detection of an SMF failure and/or restart by having the NRF update a status attribute of an SMF and/or other NF instance when a heartbeat failure is detected, and notifying any subscribed NFs of the change in the status attribute. In some example implementation, and as noted herein, additional attributes may be changed through the use of NRF services, such as updating the status of the relevant SMF or relevant service instance at the NFService level, for example. By way of another example, a timing attribute reflecting a recovery time can be used to represent the time at which the relevant SMF (or other NF) instance and/or other NF service instance was started and/or restarted, allowing for resources or services that are associated with times before the failure or restart to be detected and considered as lost to the SMF and/or other relevant NF.

As reflected in some of the terminology used to describe some of the example implementations presented herein, some example implementations of embodiments of the invention described herein contemplate the use of modifications to network specifications, architectures, and/or protocols as a pathway towards implementation. For example, some example implementations contemplate changes to 3GPP Release 15, such as the following:

In TS 29.510, changes to clarify the handling of the NFStatus value "SUSPENDED" can be made such that:

(i) The NRF sets the NFStatus attribute of an NF instance to SUSPENDED when detecting a heartbeat failure;

(ii) The NRF notifies subscribed NFs that the NF is suspended or deregistered in such a case (namely, the detection of a heartbeat failure and the attendant change of the NFStatus attribute to SUSPENDED, for example);

(iii) A new Status attribute is defined at the NFService level, which can be set to SUSPENDED using the NFUpdated service operation; and (iv) The NRF notifies subscribed NFs that the NFService is no longer part of the NFProfile for the relevant NF and/or is suspended.

To address situations involving an NF Failure, TS 29.510 may be adjusted such that, when detecting a heartbeat failure, the NRF sets the NFStatus of the NF instance to SUSPENDED and notifies accordingly NFs subscribed to receiving notifications of changes of the NF profile; the NFStatus attribute is added to the NFProfile in Nnrf_NF-Discovery API.

To address situations involving an NF service Failure, TS 29.510 may be adjusted to define a new NFServiceStatus attribute at the NFService level in the Nnrf_NFManagement API and Nnrf_NFDiscovery API, that may be set to "SUSPENDED" using the NFUpdate service operation; the NRF notifies NFs subscribed to receiving notification of changes of the NF profile that the NFService is suspended.

To address situations involving an NF and NF service restart, TS 29.510 may be adjusted to define a new (optional) recoveryTime attribute in the NFProfile and NFService data types of the NRF NFManagement service and Nnrf_NFDiscovery API. This represents the time at which the NF instance or NF Service instance was (re)started. It will be appreciated that a consumer NF may consider that all the resources created in the producer NF before the producer NF or NF service recovery time have been lost. This may be used to detect a restart of a NF and to trigger appropriate actions, e.g. release local resources.

With respect to TS 23.527, changes may be made to document the procedures and/or flows (such as those set out in connection with FIGS. 5-8, for example) for notifying one or more NFs of an NF (and/or NF service) failure and/or restart.

In TS 29.502, additional changes may be made. For example, a new timestamp attribute may be defined in the SMF PDUSession API, in the Create SM Context response, Create request, and Create response, to allow the SMF to return to the AMF the time at which the SM context resource is created, and/or to allow the V-SMF and H-SMF to signal to each other the time at which a given PDU session resource is created. This timestamp attribute is used in some example implementations by the AMF and/or the relevant H-SMF to identify SM contexts or PDU session contexts that have been lost after an SMF (or V-SMF or H-SMF) restart. In TS 29.502, a new attribute in the Create Request, which may be labeled vsmfServiceInstance, may be defined to allow the V-SMF to signal to the H-SMF the PDU session service instance serving the PDU session. This can be used by the H-SMF to detect (via the NRF) a restart of the corresponding V-SMF service.

It will be appreciated that example embodiments of the invention disclosed and/or otherwise described herein arise in the context of a telecommunications network, including but not limited to a telecommunications network that conforms to and/or otherwise incorporates aspects of a fifth-generation (5G) architecture. FIG. 1 is an example networked system 100 in accordance with an example embodiment of the present disclosure. FIG. 1 specifically illustrates User Equipment (UE) 102, which may be in communication with a Radio Access Network (RAN) 104 and Access and Mobility Management Function (AMF) 108 and User Plane Function (UPF) 106. The AMF 108 may, in turn, be in communication with core network services including Session Management Function (SMF) 110 and Policy Control Function (PCF) 114. The core network services may also be in communication with an Application Server/Application Function (AS/AF) 112. Other networked services also include Network Slice Selection Function (NSSF) 122, Authentication Server Function (AUSF) 120, User Data Management (UDM) 118, and Data Network (DN) 116. In some example implementations of embodiments of the present disclosure, an AMF, SMF, UPF, PCF, AUSF, UDM, AF, and NSSF are each considered to be an NF. It will be appreciated that one or more additional network functions (NF) and Network Resource Functions (NRFs) may be incorporated into the networked system. As shown in FIG. 1, NRF 124 is incorporated into the network and is configured to interface with other network functions, including but not necessarily limited to the AMF 108, the SMF 110, and the PCF 114.

Turning now to FIG. 2, examples of a core network apparatus (CNA) (including the core network services: UPF 106, AMF 108, SMF 110, PCF 114, and/or another NF and/or NRF) may be embodied as a core network apparatus 200 as configured in accordance with an example embodiment of the present disclosure. As described below in conjunction with the flowcharts of FIGS. 3 and 4, the CNA 200 of an example embodiment may be configured to perform the functions described herein. In any instance, the CNA 200 may more generally be embodied by a computing device, such as a server, a personal computer, a computer workstation or other type of computing device including those functioning as a user equipment and/or a wireless local area network. Regardless of the manner in which the CNA 200 is embodied, the apparatus of an example embodiment may be configured as shown in FIG. 2 so as to include, be associated with or otherwise be in communication with processing circuitry 208 including, for example, a processor 202 and a memory device 204 and, in some embodiments, and/or a communication interface 206.

In the processing circuitry 208, the processor 202 (and/or co-processors or any other circuitry assisting or otherwise associated with the processor) may be in communication with the memory device 204 via a bus for passing information among components of the CNA 200. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The CNA 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In embodiments that include a communication interface 206, the communication interface may be any means such as a device or circuitry embodied in either hardware or a combination of hardware and software that is configured to receive and/or transmit data from/to a network and/or any other device or module in communication with the CNA 200, such as NF, NRF, UE, radio access network, core network services, an application server/function, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/ software for supporting communication via cable, digital subscriber line (DSL), universal serial bus (USB) or other mechanisms.

FIG. 3 is an end-point flow chart according to an example embodiments of the present disclosure. As shown, the SMF 110, NRF 300 and AMF 108 (and/or any other subscriber NF, for example) interact to detect the failure and/or restart of an instance of an NF service producer (in this case, the SMF 110) through the use of NRF services. As shown in FIG. 3, NRF 300 is configured to detect a change in the status of the SMF. In some example implementations, the change of status may take the form of a failure and/or restart of the SMF 110, which can be detected at the NRF by analyzing the heartbeat (and/or the change in and/or absence of a heartbeat) associated with the SMF 110. In FIG. 3, this is illustrated with message 302, which may constitute a signal and/or message passed from the SMF 110, or may be embodied by a detection of a cessation of a signal from the SMF 110 (such as a detection of a lack of a heartbeat signal, for example).

Upon detecting the failure, restart, and/or other change in the status of the SMF 110, the NRF 300 responds by changing an attribute associated with the SMF 110. For example, the NFStatus attribute of the NF instance associated with the SMF 110 may be changed to "SUSPENDED". Regardless of the specific attribute changed with respect to the information regarding the SMF 110 available to the NRF 300, the NRF 300 then conveys (as shown in FIG. 3 as message 304) the AMF 108 and/or any other subscribed NFs that the NF instance associated with the SMF 110 is suspended and/or deregistered.

In some example implementations, as shown at message 306 in FIG. 3, the NRF also signals to the AMF 108 and/or any other subscribed NFs of the time at which the failure, restart, and/or other change in the status of the SMF 110 occurred. This time may be received at the NRF in the form of an attribute registered by the SMF 110 in its associated instance profile with the NRF, and subsequently passed to the AMF 108 and/or the other subscriber NFs. In some example implementations, the recovery time attribute may be referred to as "recoveryTime" and passed to the relevant AMF 108 and/or other subscribed NFs through an NFStatusNotify operation and/or any other approach to passing status information. It will be appreciated that in many example implementations, messages 304 and 306 may be combined and sent as a single message towards the relevant AMF/NF, and need not be sent as separate messages.

In situations where the AMF 108 and/or the subscribed NFs have received the "recoveryTime" attribute and/or another indication of the time at which the relevant failure, restart, and/or other change in status of the SMF 110 occurred, the SMF 110 may further communicate with the AMF 108 and/or the subscribed NFs (as shown as message 308) to provide a timestamp attribute indicating the time at which a given resource became associated with the SMF 110. It will be appreciated that the exchange of the timestamp attribute (shown as optional message 308) would typically occur in time before message 302. For example, the timestamp may be provided during the resource creation (such as during a PDU session establishment, for example). By comparing the timestamp to the recoveryTime attribute, resources older than the time at which the failure, restart, and/or other change in status of the SMF 110 can be determined (such as by the AMF 108 and/or the relevant NF, for example) to be lost in the SMF 110.

Referring now to FIG. 4, the operations performed, such as by the CNA 200 of FIG. 2 which may be embodied by or in association with processing circuitry 208, (and/or the NRF 300 and/or any other component described herein, are illustrated in order to provide for the detection of a failure and/or restart of an SMF and/or other NF Service Provider by an NF through the use of NRF services. As shown in block 402 of FIG. 4, the apparatus of this example embodiment includes means, such as the processing circuitry 208, the processor 202 or the like, for detecting receiving an indication in a change of a status of an NF Service Provider, such as shown by step 302 in FIG. 3. In some example implementations, the NF Service Provider is an SMF within a network environment, such as SMF 110 shown in FIG. 1. In some example implementations, the subscribed network function is an Access and Mobility Function (AMF) or Policy Control Function (PCF). Moreover, in some example implementations, the attribute associated with the network function service provider is an NFStatus or NFServiceStatus attribute of a network function profile or network function service profile set to SUSPENDED. In some such example implementations, the change in status may be a restart of the NF Service Provider instance (such as an SMF instance and/or an SMF service instance, for example) and/or a failure of the NF Service Provider instance (such as an SMF instance and/or an SMF service instance, for example).

As shown in block 404 of FIG. 4, the apparatus of this example embodiment includes means, such as the processing circuitry 208, the processor 202 or the like, for changing a status attribute associated with the NF Service Provider. As discussed herein, in some example implementations, an NRF, upon receipt of the indication of the change in status of the NF Service Provider (which, as discussed herein, may be associated with a SMF heartbeat and/or other indication of a change in the status of the relevant NF Service Provider, for example), change an NFStatus attribute at the NFService Level of a NF profile maintained and/or available to the NRF to indicate that the relevant NF Service Provider is suspended.

As shown in block 406 of FIG. 4, the apparatus of this example embodiment includes means, such as the processing circuitry 208, the processor 202, communication interface 206 or the like, for notifying a subscribed NF of the change in status, of the NF Service Provider, such as shown by message 304 in FIG. 3. By providing one or more subscribed NFs (such as an AMF, for example) a notification of the changed status of the relevant NF Service Provider, the notified NFs can operate in response to the failure and/or restart (or other change in status) of the relevant NF Service Provider.

Additional optional operations may be performed in connection with example implementations of the process shown in FIG. 4. It will be appreciated that in many example implementations, the operations described with respect to block 408 (and block 410 described below, occur prior in time to the operations performed in connection with block 406, and are thus shown as intervening between block 404 and 406. However, since the operations shown in blocks 408 and 410 are optional with respect to the process shown in FIG. 4, it will be appreciated that, while in some example implementations the process may proceed from block 404 to block 408, to block 410, and then to block 406, other orders of the blocks may be used, and one or more operations associated with an optional block may be omitted. As shown in optional block 408 of FIG. 4, the apparatus of this example embodiment may, in some instances, include means, such as the processing circuitry 208, the processor 202, communication interface 206 or the like, for identifying a time at which the status change for the NF Service Provider occurred. As discussed herein, including, for example in connection with message 306 of FIG. 3, and elsewhere in this disclosure, the NF service provider may register the relevant time (such as through the use of an attribute denoted as "recoveryTime" in its instance profile with the NRF.

As shown in optional block 410 of FIG. 4, the apparatus of this example embodiment may, in some instances, include means, such as the processing circuitry 208, the processor 202, communication interface 206 or the like, for associating the identified time with an NF instance and/or a NF service provider instance. As discussed herein with respect to the message 306 of FIG. 3 and elsewhere in this disclosure, the NRF (as shown, for example as message 306 of FIG. 3), may pass an indication of the relevant time to the appropriate AMF and/or other subscribed NFs.

As shown in optional block 412 of FIG. 4, the apparatus of this example embodiment may, in some instances, include means, such as the processing circuitry 208, the processor 202, communication interface 206 or the like, for determining a set of network resources associated with the NF Service Provider prior to the identified time. In some example implementations, this may involve receiving a notification of the change in status of a network function service provider, optionally including the time at which the change in the status of the network function service provider occurred. As discussed herein with respect to the message 310 of FIG. 3 and elsewhere in this disclosure, the NF Service Provider (as shown, for example as message 310 of FIG. 3), may pass an indication of a timestamp and/or other indication of the time at which a relevant resource became associated with the NF Service Provider. In some example implementations, by comparing the timestamp (or similar indication) to the recoveryTime attribute (or a similar indication), the AMF and/or other relevant NF can determine whether a given resource was lost in the NF Service provider due to its association with the NF service provider prior to the time of the change in status.

FIG. 5 is an end-point flow chart according to an example embodiments of the present disclosure. As with other example implementations described herein, the flow chart in FIG. 5 is designed to illustrate an approach that may be taken to allow an NF to detect the failure and/or restart of a peer NF and/or an NF service using the NRF, and illustrates procedures that may be supported by NFs to detect the failure and/or restart of an NF or NF service.

As shown in FIG. 5, a first NF 502 (marked as NF(A)) is configured to be capable of communicating in a network environment with a second NF 504 (marked as NF(B)) and an NRF 506. As shown in FIG. 5 at message 508, NF(A) 502 subscribes to the NRF to receive notifications of changes of the profile of NF(B) 504. In some example implementations, this may be accomplished in accordance with procedures set out in 3GPP TS 29.510 and/or through the use of an Nnrf_NFManagement_NFStatusSubscribe Req/Rsp message from NF(A) 502 to the NRF 506. As shown at point 510 in FIG. 5, an NF failure subsequently occurs at NF(B) 504. As shown at point 512 in FIG. 5, the NRF 506 detects that NF(B) 504 is no longer operative. In some example implementations, this detection may be accomplished through the use of the NF heartbeat procedure set out in subclause 5.2.2.3.2 of 3GPP TS 29.510. Regardless of the approach used to detection the failure in NF(B) 504, the NRF 506 then changes the NFStatus attribute of NF(B) 504 to SUSPENDED. As shown at message 514, the NRF 506 then notifies NF(A) 502 and/or any other relevant NFs that have subscribed to receive notifications of changes in the profile of NF(B) 504 that the NFStatus attribute of NF(B) is SUSPENDED. In some example implementations, this may be accomplished through the transmission of an Nnrf_NF-Management_NFStatusNotify Req/Rsp message from the NRF 506 to NF(A) 502 and/or any other relevant NFs. Upon receiving the indication that the NF Status of NF(B) 504 is SUSPENDED, NF(A) 502 and/or any other relevant NFs may trigger appropriate restoration and/or clean-up actions to address the impact of the change in status of NF(B) 504.

FIG. 6 is an end-point flow chart according to an example embodiments of the present disclosure. As with other example implementations described herein, the flow chart in FIG. 6 is designed to illustrate an approach that may be taken to allow an NF to detect the failure and/or restart of an NF service using the NRF, and illustrates procedures that may be supported by NFs to detect the failure and/or restart of an NF or NF service.

As shown in FIG. 6, a first NF 602 (marked as NF(A)) is configured to be capable of communicating in a network environment with a second NF 604 (marked as NF(B)) and an NRF 606. As shown in FIG. 6 at message 608, NF(A) 602 subscribes to the NRF to receive notifications of changes of the profile of NF(B) 604. In some example implementations, this may be accomplished in accordance with procedures set out in 3GPP TS 29.510 and/or through the use of an Nnrf_NFManagement_NFStatusSubscribe Req/Rsp message from NF(A) 602 to the NRF 606. As shown at point 610 in FIG. 6, an NF service failure subsequently occurs at NF(B) 604, resulting in the failure of a particular service, but leaving NF(B) 604 otherwise operative. As shown at message 612 in FIG. 6, the NF(B) 604 (or, for example, an OAM) updates the profile of NF(B) 604 by setting the NFServiceStatus attribute of the failed NF service to SUSPENDED. In some example implementations, this may be accomplished through the use of an Nnrf_NFManagement_NFUpdate Req/Rsp message sent from the NF(B) 604 to the NRF 606. As shown at message 614, the NRF 606 then notifies NF(A) 602 and/or any other relevant NFs that have subscribed to receive notifications of changes in the profile of NF(B) 604 that the NFStatus attribute of the particular failed NF service of NF(B) 604 is SUSPENDED. In some example implementations, this may be accomplished through the transmission of an Nnrf_NFManagement_NFStatusNotify Req/Rsp message from the NRF 606 to NF(A) 602 and/or any other relevant NFs. Upon receiving the indication that the NF Status of the failed service of NF(B) 604 is SUSPENDED, NF(A) 602 and/or any other relevant NFs may trigger appropriate restoration and/or clean-up actions to address the impact of the change in status of the NF service that failed in NF(B) 604.

FIG. 7 is an end-point flow chart according to an example embodiments of the present disclosure. As with other example implementations described herein, the flow chart in FIG. 7 is designed to illustrate an approach that may be taken to allow an NF to detect the restart of another NF using the NRF, and illustrates procedures that may be supported by NFs to detect the restart of an NF.

As shown in FIG. 7, a first NF 702 (marked as NF(A)) is configured to be capable of communicating in a network environment with a second NF 704 (marked as NF(B)) and an NRF 706. As shown in FIG. 7 at message 708, the NF(B) 704 (or OAM, for example) registers a profile for NF(B) 704 to the NRF 706. In some example implementations, the profile of NF(B) 704 may include the recoveryTime attribute described herein, and doing so may be advantageous in situations where the restart of NF(B) 704 may result in the loss of one or more contexts. In some example implementations, the registration of the profile of NF(B) 704 may be accomplished through the transmission of an Nnrf_NFManagement_NFRegister Req/Rsp message between the NF(B) 704 and the NRF 706. As shown at message 710, NF(A) 702 subscribes to the NRF to receive notifications of changes of the profile of NF(B) 704. In some example implementations, this may be accomplished in accordance with procedures set out in 3GPP TS 29.510 and/or through the use of an Nnrf_NFManagement_NFStatusSubscribe Req/Rsp message from NF(A) 702 to the NRF 706. As shown at point 712 in FIG. 7, NF(B) 704, restarts. As shown at message 714 in FIG. 7, if contexts are lost during the restart, the NF(B) 704 (or, for example, an OAM) updates the recoveryTime attribute for the profile of NF(B) 704 at the NRF 706. In some example implementations, this may be accomplished through the use of an Nnrf_NFManagement_NFUpdate Req/Rsp message sent from the NF(B) 704 to the NRF 706. As shown at message 716, the NRF 706 then notifies NF(A) 702 and/or any other relevant NFs that have subscribed to receive notifications of changes in the profile of NF(B) 704 that the recoveryTime attribute of NF(B) 704 has been updated. In some example implementations, this may be accomplished through the transmission of an Nnrf_NFManagement_NFStatusNotify Req/Rsp message from the NRF 706 to NF(A) 702 and/or any other relevant NFs. Upon receiving the indication that the updated recoveryTime attribute in the profiled of NF(B) 704, NF(A) 702 and/or any other relevant NFs may trigger appropriate restoration and/or clean-up actions to address the impact of the change in status. For example, NF(A) 702 may consider that all of the resources created in the NF(B) 704 prior to the updated NF(B) 704 recoveryTime have been lost, and the appropriate responsive actions may be triggered.

FIG. 8 is an end-point flow chart according to an example embodiments of the present disclosure. As with other example implementations described herein, the flow chart in FIG. 8 is designed to illustrate an approach that may be taken to allow an NF to detect the restart of and NF Service in another NF using the NRF, and illustrates procedures that may be supported by NFs to detect the restart of an NF Service in another NF.

As shown in FIG. 8, a first NF 802 (marked as NF(A)) is configured to be capable of communicating in a network environment with a second NF 804 (marked as NF(B)) and an NRF 806. As shown in FIG. 8 at message 808, the NF(B) 804 (or OAM, for example) registers a profile for NF(B) 804 to the NRF 806. In some example implementations, the profile of NF(B) 704 may include the recoveryTime attribute described herein, and doing so may be advantageous in situations where the restart of NF(B) 804 and/or a related service may result in the loss of one or more contexts. In some example implementations, the registration of the profile of NF(B) 804 may be accomplished through the transmission of an Nnrf_NFManagement_NFRegister Req/Rsp message between the NF(B) 804 and the NRF 806. As shown at message 810, NF(A) 802 subscribes to the NRF 806 to receive notifications of changes of the profile of NF(B) 804. In some example implementations, this may be accomplished in accordance with procedures set out in 3GPP TS 29.510 and/or through the use of an Nnrf_NFManagement_NFStatusSubscribe Req/Rsp message from NF(A) 802 to the NRF 806. As shown at point 812 in FIG. 8, a service of NF(B) 804 restarts. As shown at message 814 in FIG. 8, if contexts are lost during the restart, the NF(B) 804 (or, for example, an OAM) updates the recoveryTime attribute for the particular service noted in the profile of NF(B) 804 at the NRF 806. In some example implementations, this may be accomplished through the use of an Nnrf_NFManagement_NFUpdate Req/Rsp message sent from the NF(B) 804 to the NRF 806. As shown at message 816, the NRF 806 then notifies NF(A) 802 and/or any other relevant NFs that have subscribed to receive notifications of changes in the profile of NF(B) 804 that the recoveryTime attribute of the restarted service of NF(B) 804 has been updated. In some example implementations, this may be accomplished through the transmission of an Nnrf_NFManagement_NFStatusNotify Req/Rsp message from the NRF 806 to NF(A) 802 and/or any other relevant NFs. Upon receiving the indication that the updated recoveryTime attribute in the profiled of NF(B) 804, NF(A) 802 and/or any other relevant NFs may trigger appropriate restoration and/or clean-up actions to address the impact of the change in status. For example, NF(A) 802 may consider that all of the resources created in the service of NF(B) 804 prior to the updated NF(B) 804 recoveryTime have been lost, and the appropriate responsive actions may be triggered.

It will be appreciated that adjustments to TS 23.527 may be made to account for the processes and procedures set out in connection with FIGS. 5-8.

As indicated herein, some example implementations of the present disclosure may be implemented through adjustments to 3GPP Rel. 15 procedures, protocols, and/or standards. For example, with respect to TS 29.502, the definition of SmContextCreatedData may be adjusted to incorporate a creationTime attribute, of type DateTime, with a P of O, and cardinality of 0.1, which acts as a time stamp when the SM context is created in the SMF (or V-SMF). This IE may be used by the NF Service Consumer to identify the SM contexts created before the SMF or SMF PDUSession service recovery time. The definition of SmContextCreatedData may also be adjusted to incorporate a hSmfCreationTime attribute of type DateTime, with a P of O and cardinality of 0.1, which acts as a Time stamp when the PDU session is created in the H-SMF.

This IE may be used by the NF Service Consumer to identify the PDU sessions created in the H-SMF before the H-SMF or H-SMF PDUSession service recovery time. Similar adjustments may be made to the definition of PduSessionCreateData and PduSessionCreatedData, and reflected in the relevant portions of the NnrfN_NFManagement API.

With respect to TS 29.510, the description of the NF heart-beat contained at 5.2.2.3.2 may be adjusted such that when the NRF detects that a given NF has not updated its profile for a configurable amount of time (longer than the heart-beat interval), the NRF changes the status of the NF to SUSPENDED and considers that the NF as deregistered and its services can no longer be discovered by other NFs via the NFDiscovery service. The NRF notifies NFs subscribed to receiving notifications of changes of the NF Profile that the NF status has been changed to SUSPENDED. The definition of the type NFProfile may also be adjusted to incorporate a recoveryTime attribute of data type DateTime, with a P of O and cardinality of 0.1, which functions as a time stamp when the NF is (re)started. It will be appreciated that, in connection with such an adjustment, the NRF shall notify NFs subscribed to receiving notifications of changes of the NF profile that the NF service is SUSPENDED if the NF status is updated to SUSPENDED. Moreover, it will be appreciated that a requester NF may consider that all the resources created in the NF before the NF recovery time have been lost. This may be used to detect a restart of a NF and to trigger appropriate actions, e.g. release local resources.

Also within TS 29.510, the definition of type NFService may be adjusted such to incorporation an nfServiceStatus attribute, of data type NFServiceStatus, with a P of M and cardinality of 0.1, which serves as the status of the NF service instance. It will be appreciated that, in connection with such an adjustment, the NRF shall notify NFs subscribed to receiving notifications of changes of the NF profile that the NF service is SUSPENDED if the NF service status is updated to SUSPENDED. Moreover, in connection with such an adjustment, a requester NF subscribed to NF status changes may consider that all the resources created in the NF service before the NF service recovery time have been lost. This may be used to detect a restart of a NF service and to trigger appropriate actions, e.g. release local resources.

In the enumeration of NFServiceStatus set out in TS 29.510 it may be advantageous to establish enumeration values of REGISTERED (which serves to indicate that the NF Service Instance is registered in NRF and can be discovered by other NFs) and SUSPENDED (which serves to indicate that The NF Service Instance is registered in NRF but it is not operative and cannot be discovered by other NFs). Corresponding changes may also be made to the relevant APIs.

As described above, FIGS. 3, 4, 5, 6, 7, and 8 illustrate flowcharts of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by processing circuitry 208 e.g., a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for identifying a change of status of a session management function (SMF) within a network environment comprising:
   detecting or receiving at a network resource function (NRF), an indication of a change in a status of a SMF including a time at which the change in the status of the SMF occurred;
   identifying one or more resources lost to the SMF by determining a set of network resources associated with the SMF prior to the time;
   changing, in the NRF, an attribute associated with the one or more resources to indicate a status of suspended, wherein the attribute comprises at least one of an NFStatus attribute or an NFServiceStatus attribute of a profile associated with the SMF; and
   notifying a subscribed network function of the change in status of the SMF, wherein the subscribed network function is an Access and Mobility Function (AMF) or a Policy Control Function (PCF).

2. The method of claim 1, wherein the change of the status of the SMF is a failure of a network function instance or a network function Service instance.

3. The method of claim 1, wherein the change of the status of the SMF is a restart of a network function instance or a network function Service instance.

4. The method of claim 1, further comprising:
   identifying a time at which the change in the status of the SMF occurred; and
   associating the time with an instance of the SMF.

5. An apparatus for identifying a change of status of a SMF within a network environment, the apparatus comprising at least one processor and at least one memory including computer program code, the at least one memory and the computer program code configured to, with the processor, cause the apparatus to at least:
   detect or receive an indication of a change in a status of a SMF including a time at which the change in the status of the SMF occurred;
   identify one or more resources lost to the SMF by determining a set of network resources associated with the SMF prior to the time;
   change an attribute associated with the set of network resources to indicate a status of suspended, wherein the attribute comprises at least one of an NFStatus attribute or an NFServiceStatus attribute of a profile associated with the SMF; and
   notify a subscribed network function of the change in status of the SMF, wherein the subscribed network function is an Access and Mobility Function (AMF) or a Policy Control Function (PCF).

6. The apparatus of claim 5, wherein the change of the status of the SMF is a failure of a network function instance or a network function Service instance.

7. The apparatus of claim 5, wherein the change of the status of the SMF is a restart of a network function instance or a network function Service instance.

8. The apparatus of claim 5, the at least one memory and the computer program code further configured to, with the processor, cause the apparatus to at least:
   identify a time at which the change in the status of the SMF occurred; and
   associate the time with an instance of the SMF.

9. A non-transitory computer-readable storage medium for identifying a change of status of a session management function (SMF) within a network environment, the non-transitory computer-readable storage medium storing program code instructions that, when executed, cause an apparatus to:
   detect or receive an indication of a change in a status of a SMF including a time at which the change in the status of the SMF occurred;
   identify one or more resources lost to the SMF by determining a set of network resources associated with the SMF prior to the time;
   change an attribute associated with the set of network resources to indicate a status of suspended, wherein the attribute comprises at least one of an NFStatus attribute or an NFServiceStatus attribute of a profile associated with the SMF; and
   notify a subscribed network function of the change in status of the SMF, wherein the subscribed network function is an Access and Mobility Function (AMF) or a Policy Control Function (PCF).

10. The non-transitory computer-readable storage medium of claim 9, wherein the change of the status of the SMF is a failure of a network function instance or a network function Service instance.

11. The non-transitory computer-readable storage medium of claim 9, wherein the change of the status of the SMF is a restart of a network function instance or a network function Service instance.

12. The non-transitory computer-readable storage medium of claim 9, the program code instructions that, when executed, further cause an apparatus to:
   identify a time at which the change in the status of the SMF occurred; and
   associate the time with an instance of the SMF.

* * * * *

UNITED STATES PATENT AND TRADEMARK OFFICE
CERTIFICATE OF CORRECTION

PATENT NO. : 11,539,579 B2
APPLICATION NO. : 17/266706
DATED : December 27, 2022
INVENTOR(S) : Bruno Landais It is certified that error appears in the above-identified patent and that said Letters Patent is hereby corrected as shown below:

In the Claims

In Column 23, Line 1, Claim 5, delete "(AM F)" and insert -- (AMF) --, therefor.

In Column 24, Line 8, Claim 9, delete "(AM F)" and insert -- (AMF) --, therefor.

Signed and Sealed this
Thirteenth Day of June, 2023

Katherine Kelly Vidal
*Director of the United States Patent and Trademark Office*